April 14, 1964
W. J. HUBER
3,128,871
TRANSPORTABLE FLEXIBLE BELT CONVEYOR
Filed Aug. 29, 1960
2 Sheets-Sheet 1
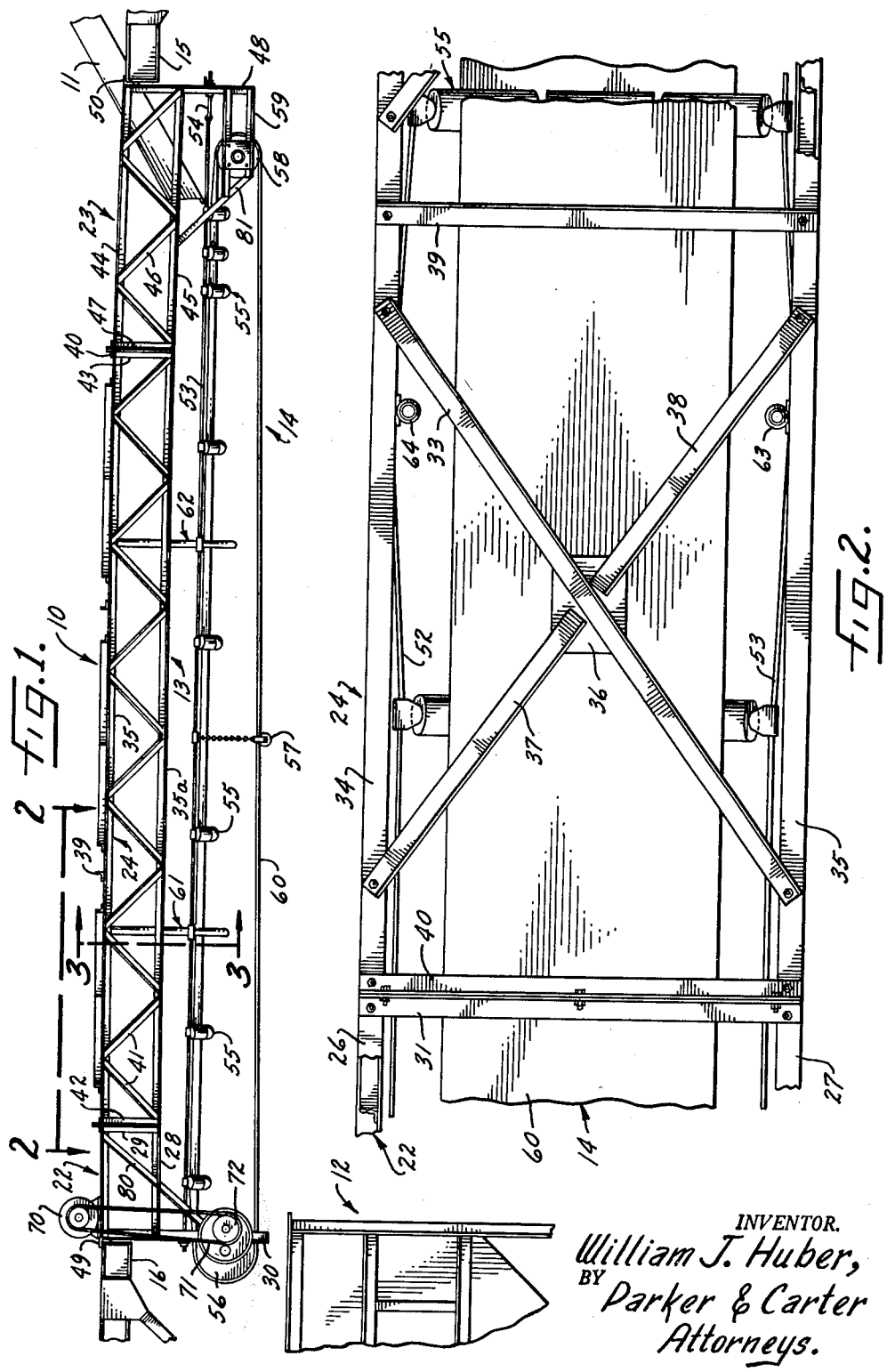
INVENTOR.
William J. Huber,
BY Parker & Carter
Attorneys.

April 14, 1964 W. J. HUBER 3,128,871
TRANSPORTABLE FLEXIBLE BELT CONVEYOR
Filed Aug. 29, 1960 2 Sheets-Sheet 2

INVENTOR.
William J. Huber,
BY Parker & Carter
Attorneys.

United States Patent Office
3,128,871
Patented Apr. 14, 1964

3,128,871
TRANSPORTABLE FLEXIBLE BELT CONVEYOR
William J. Huber, Oak Lawn, Ill., assignor to Goodman Manufacturing Company, Chicago, Ill., a corporation of Illinois
Filed Aug. 29, 1960, Ser. No. 55,613
3 Claims. (Cl. 198—184)

This invention relates in general to flexible belt conveyors and in particular to a lattice frame conveyor utilizable for short hauls in which the vertical forces in the system virtually balance out so that the conveyor, though constructed of very light materials, can carry relatively heavy loads.

Belt conveyors of the type illustrated in the Craggs et al. Patent No. 2,773,257, have come into increasingly widespread use in recent years due to their many inherent desirable features. Among these features are high carrying capacity, low cost, and ease of installation and maintenance. This type of conveyor is also readily adaptable to a wide variety of environmental operating conditions. It may, for example, be utilized in lengths of up to many thousands of feet in underground work such as coal mines. The basic system however is utilizable in any length down to and including short hauls of a few feet.

Such a conveyor may be especially useful in short haul environments because of its easy installation. It may be desirable, for example, to provide a short haul conveyor extending between a relatively fixed feeder point and a relatively fixed discharge point spanning a road, stream, railroad track or other natural obstacle. Likewise, such conveyors are often utilized in manmade installations such as processing plants where raw or semi-finished materials must be transported from one operating station to another for further processing or packaging.

Such short haul conveyors, because of their location, are almost invariably supported from elevated support points. As a consequence, the conveyor supporting structure must be made of relatively heavy gauge material and be of considerable strength since it is often not feasible to support the conveyor from intermediate locations. Heavy materials must be utilized because all forces on the conveyor, including the weight of the framework and the conveyor itself, are acting in a downward direction. Such a heavy construction is rather expensive to design and fabricate and presents installation problems due to the weight of the structure.

Accordingly, a primary object of this invention is to provide a conveyor in which upwardly directed collapsing or buckling forces of virtually any desired magnitude can be imposed on the conveyor during installation so that downwardly directed dead weight and load induced forces will effectively cancel out the buckling forces, thereby resulting in a strong conveyor of relatively light weight.

Another object is to provide a lattice frame conveyor especially useful for short hauls that can carry extremely heavy loads, yet is of extremely light construction as contrasted with short haul conveyors of conventional construction.

Yet another object is to provide a lattice frame conveyor utilizing standard parts so that it can be easily fabricated, quickly assembled and easily knocked down.

Yet another object is to provide a flexible belt lattice frame conveyor in which catenary sag is reduced or substantially eliminated in the roller assembly supporting strands which in turn provide good belt-roller contact.

Yet another object is to provide a light weight conveyor capable of accommodating loads far greater than those handled by conventional conveyors of equivalent gauge material which can be set up as a temporary or permanent installation for spanning relatively short distances such as railroad tracks, streams, gullies, depressions and roads.

Yet a further object is to provide a conveyor having all of the aforementioned advantages which is easily expandable or contractable to any desired length by merely adding or subtracting sections.

Yet another object is to provide a method of installing a lattice frame conveyor in such a manner as to result in a vertically substantially dynamically balanced system.

Yet a final object is to provide a method of conveying materials over short distances in a system in which the vertical forces substantially effectively cancel out one another so that the system is in a state of virtual dynamic vertical equilibrium during operation.

Other objects will become apparent from a reading of the following specification and claims.

The invention is illustrated more or less diagrammatically in the accompanying drawings wherein;

FIGURE 1 is an elevation of the conveying system of the present invention;

FIGURE 2 is a top plan view of the structure of FIGURE 1 taken substantially along the line 2—2 of FIGURE 1;

Like reference numerals will be used to refer to like parts throughout the following description of the drawings.

Figure 3:
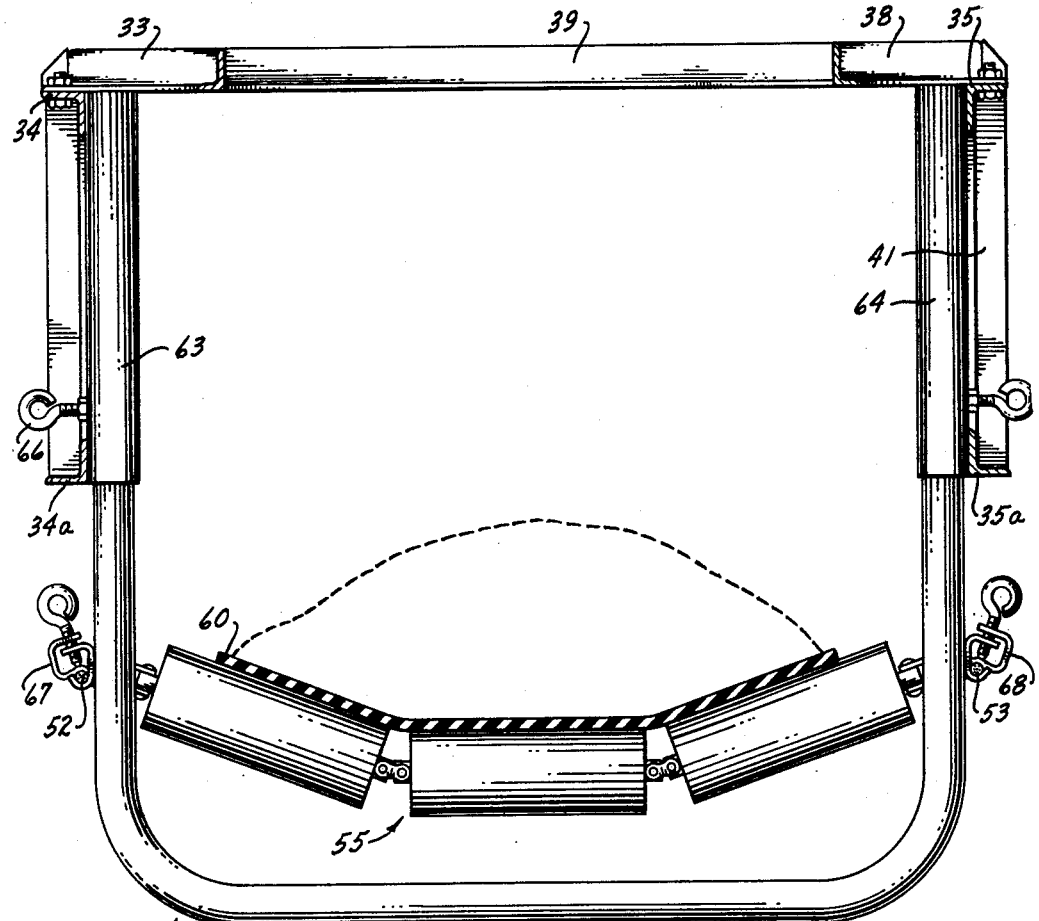
FIGURE 3 is a section through FIGURE 1 taken substantially along the line 3—3 of FIGURE 1.

The conveyor system is indicated generally at 10 in FIGURE 1. It extends between a supply or feeder area, such as a chute 11, and a discharge area indicated generally by the reference numeral 12. The distance between the supply and discharge areas 11 and 12 may vary considerably but, as a general rule, the length of the conveyor system will fall somewhere between 20 and 100 feet.

The conveyor system 10 includes a lattice framework 13 from which a flexible belt conveyor 14 is suspended. The lattice framework, and consequently the flexible belt conveyor 14, are suspended from any suitable supports, such as the steel girders 15 and 16 adjacent the supply and discharge areas, respectively.

The lattice framework consists of a plurality of sections which have been bolted or otherwise suitably secured to form a framework of any desired length. In this instance, a short head section 22 and a slightly longer tail section 23 have been bolted to an intermediate section of even greater length 24. It will be understood that one or more intermediate sections 24 may be utilized but for purposes of description and illustration of the invention, a single intermediate section will suffice.

Head section 22 consists essentially of a pair of upper stringers 26 and 27, a pair of lower stringers 28, vertical rear end members 29 and forwardly located force transmitting end anchor members 30. The sides of the head section are connected to one another and maintained a fixed distance apart by transversely positioned angles 31. Although any suitable structural members may be used in the construction of the sections, it has been found convenient to use L-channels as illustrated in the drawing. The various members may be welded or bolted to one another. In this instance, virtually all connections are bolted.

The sides of intermediate section 24 are disposed in substantially parallel planes with respect to one another and maintained a fixed distance apart by the cross bracing structure illustrated best in FIGURE 2. A continuous brace 33 is bolted at its ends to the top surfaces of upper longitudinal intermediate section stringers 34, 35 and welded at its midportion to a flat rectangular plate 36. A pair of cross braces 37, 38 are bolted at their outer ends to the upper surfaces of longitudinal section stringers 34, 35 and welded at their inner ends to the plate 36. Channels 33, 37 and 38 and plate 36 form a rigid cross brace which maintains the sideframes a fixed distance apart. Additional reinforcing is supplied by brace 39 which is positioned transversely of the framework. As indicated in FIGURES 1 and 2, this same top cross bracing structure may be repeated along the length of the intermediate section 24 so as to provide stiffening over the length of the section. A head brace member 40 is bolted to the upper flanges of section stringers 34, 35 at the head end of the section. The upwardly extending flanges of transverse brace members 31 and 40 lie back to back to one another so that the head and intermediate sections can be bolted to one another through these upstanding, abutting flanges.

Each intermediate section also includes lower longitudinal sections stringer 34a and 35a. The upper and lower longitudinal stringers are maintained a fixed distance apart by angular brace members 41 which form repeating triangles along the length of the section. At the head end of the section a vertical brace member 42 is bolted at its upper and lower ends to the outer flanges of the longitudinal stringers. The outwardly extending flange of brace 42 abuts the outwardly extanding flange of member 29 so that the head and intermediate sections may also be bolted to one another in a vertical direction. A similar vertical brace member 43 is bolted to the tail of the intermediate section.

Tail section 23 is substantially a replica of intermediate section 24 to a smaller scale. Each sideframe of this section includes longitudinal section stringers 44 and 45 which are maintained a fixed vertical distance apart and parallel to one another by triangular reinforcing braces 46. A vertical reinforcing member 47 at the head end of the section and is bolted to vertical brace 43 of the intermediate section. A pair of transverse channel members similar to the arrangement at the head end of the intermediate section is used to bolt the tail and intermediate sections together across the top of the sideframes. Each tail section terminates in a downwardly extending force transmitting end anchor member 48 similar to member 30 at the forward end of the head section.

A pair of supporting brackets, which in this instance are L-channels 49, 50, are welded across the width of the lattice framework at the head and tail sections, respectively. The brackets are so arranged that the outwardly extending flanges rest on the supporting points, in this instance beams 15, 16 to thereby support the lattice framework and the conveyor from the supports.

A flexible belt conveyor of the general type illustrated in the aforementioned Craggs et al. patent is suspended from the lattice framework 10. Although a flexible strand conveyor has been shown, it should be understood that the principles of the present invention may be utilized with other types of conveyors, including a rigid frame conveyor, and accordingly the illustrated structure should be taken as illustrative only.

The conveyor consists essentially of a pair of flexible strands 52, 53 which are anchored at each end to the end anchor members 30 and 48. The flexible strands or wire ropes 52, 53 are placed under tension by any suitable tensioning means 54 located at one or both ends of the lattice framework. A plurality of troughing roller assemblies 55 are suspended at intervals from the sideframes. As illustrated, the roller assemblies are spaced considerably closer together at the tail end of the conveyor to absorb the impact forces resulting from the dumping of the material from chute 11 onto the conveyor. A head or drive pulley 56 is journaled on the forward end anchor members 30 and a return roller assembly 57 is suspended from the wire ropes 52 and 53 at approximately their midpoint. A tail pulley 58 is mounted on any suitable framework 59 carried by the end anchor members 48. An orbitally movable flexible belt 60 is driven by the belt drive pulley 56.

A pair of tubular support structures 61 and 62 extending downwardly from the lattice framework furnish intermediate support for the wire ropes 52, 53. Since the construction of each of these assemblies is substantially identical only one will be described in detail.

Tubular support structure 61 consists essentially of a pair of pipes 63, 64 which are vertically welded to the inside flanges of the upper and lower longitudinal section stringers 34, 34a and 35, 35a. In this instance, tubular members 63, 64 are shown as extending downwardly only a distance equal to the vertical height of the sideframe but it will be understood that within the scope of the invention the exact length of the tubular members may vary considerably. A U-shaped tubular frame 65 is arranged to be vertically reciprocable within the tubular members 63, 64. The position of the U-shaped supporting brackets may be varied at will. Suitable positioning and adjusting means, such as the eye screws 66 threaded through nuts welded to the side surface of tubular members 63, and 64, fix the vertical position of frame 65.

A pair of clamp structures 67, 68 are welded to the outside of each upwardly extending arm of the U-shaped support 65 and receive the wire ropes 52, 53.

Power is imparted to the drive pulley 56 by a motor 70 mounted on the top of head section 22. A power connection 71 extends downwardly to a suitable speed reducer 72, the output shaft of which is keyed to the drive shaft of drive pulley 56.

Downwardly extending end anchor member 30 is reinforced by a brace 80. It will be noted that in this instance brace 80 is bolted to both the upper and lower longitudinal section stringers 27, 28 and extends downwardly to a point below the point at which the wire ropes are fastened to end anchor member 30. Likewise, an upwardly, forwardly extending brace member 81 braces the forward end of the tail pulley supporting framework 59. The effective connection of brace 81 to the end anchor member 48 lies below the point of connection of the wire ropes 52, 53 to member 48.

A close inspection of FIGURE 1 will show that the lattice framework has a slight upward arch from end to end. It will also be noted that the longitudinal section stringers form, in effect, a longitudinal stringer extending the entire length of the conveyor. Future reference to the longitudinal stringer in this specification and the appended claims will refer to the stringer as it extends from end to end.

Figure 4:
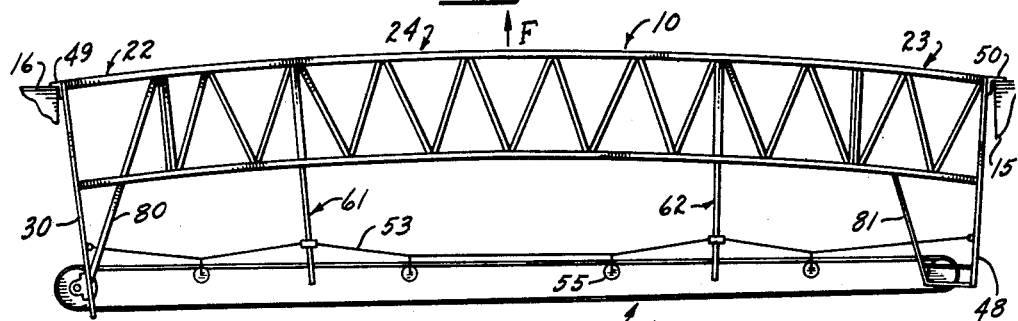
FIGURE 4 is a schematic view of the system showing, in exaggerated fashion, the effect of the distribution of forces in the system.

The use and operation of the invention are as follows:

To install the conveyor of this invention, the head and tail sections 22 and 23 are first bolted to the desired number of intermediate sections 24. Since the intermediate section side frames are identical, the width of the framework may be varied by merely varying the length of transverse brace members 33, 37, 38, 39 and 40. Once the head, tail and intermediate sections are secured to one another, they are lifted bodily into place between the supports 15 and 16. The head and tail supporting brackets 49 and 50 rest upon the abutting ends of the supports 15 and 16. Wire ropes 52, 53 may be fastened to the end anchor members 30 and 48 either before or after the lattice framework is lifted into place. In any event, once the framework is in place, the wire ropes are tightened by turnbuckles or other suitable means 54. The wire ropes are reefed up until the lattice framework begins to bow upwardly as is clearly apparent from a study of FIGURE 4 in which the relative positions of the parts have been exaggerated for illustrative purposes. The inward drawing of the end anchor members 30 and 48 towards one another is thus transmitted into an upwardly directed load resisting force F in the lattice framework. The triangular reinforcing braces 80, 81 provide reinforcement of the end anchor members 30 and 48 to prevent their collapse when the wire ropes are reefed up. In order to obtain the full benefit of the reinforcing braces 80, 81 the wire ropes are secured to the end anchor members at locations above the connections of the braces to the anchor members.

Either before or after the wire ropes are tensioned, the roller assemblies are suspended from the wire ropes. Although fully flexible roller assemblies have been illustrated, it will be understood that the invention is not confined to such a construction as virtually any type of roller assembly could be utilized in this invention. Likewise, although the return roller assembly 57 has been shown suspended from the wire ropes, it is entirely within the scope of the invention to suspend the return rollers from independent supporting structure.

Incidentally, it should be noted that the wire ropes 52, 53 need not form the supporting structure of the return roller assemblies. Thus the wire ropes could be connected to the end anchor members 30, 48 and the return roller assemblies supported from independent longitudinal members spaced generally parallel to the wire ropes.

The position of the wire ropes in relation to the bottom of the lattice framework is further adjusted by the telescopic U-shaped support members 61 and 62. These members also furnish support which helps eliminate the caternary sag effect between the head and tail support points of the wire ropes.

The wire ropes will usually be tensioned to a point such that the catenary sag or droop in the system is substantially eliminated. There will always be some sag in the ropes as can be seen from the exaggerated position of the ropes in FIGURE 4, but the roller assemblies can be easily maintained level with one another by means of the supports 61, 62, proper spacing of the assemblies, and the tension in the ropes.

Once the wire ropes have been tensioned to induce the upwardly directed load resisting force in the lattice framework, the weight of the conveyor itself then will act in a direction tending to counteract these upwardly directing load resisting forces. As a practical matter, the wire ropes will be tensioned to a point at which the downwardly directed loads imposed on the structure by the weight of the conveyor itself and the weight of the conveyed material will approximate the upwardly directed load resisting forces. It is desirable to so correlate the stresses in the system, however, that the upwardly directed load resisting force will at all times be somewhat greater than the sum of the downwardly acting forces. It will be seen from the above description that the correlation of the upper and downwardly directed forces can be controlled by varying the tension on the wire ropes 52 and 53 by the turnbuckles or other suitable tensioning means 54.

When the dead weight of the conveyor and the variable weight of the load is imposed on the lattice framework, the framework will settle downwardly to some extent to roughly the position of FIGURE 1. By comparing the relative arching or doming effect of the upper longitudinal stringer in FIGURES 1 and 4, it will be seen that the end result is a structure having only a very slight doming effect. By sliding the telescopic U-shaped supports 61 in and out of the tubular supporting tubes 63, 64, it is possible to maintain the wire ropes 52, 53 at any desired elevation independently of the posture of the lattice framework.

The head and tail supporting brackets 49, 50 should be free to move forwardly and rearwardly along the head and rear supports 15 and 16 because as forces are imposed on the lattice framework, the overall length of the framework will first shorten and then lengthen. It should also be noted that within the scope of the invention the supporting brackets might be mounted on slidable bases to facilitate movement along the supports 15 and 16.

It should also be noted that although in this instance the wire ropes and the flexible conveyor belt have been shown as positioned beneath the lattice framework, it is entirely within the scope of the invention to position the conveyor above the lattice framework. It is only necessary that the weight of the conveyor and the load on it be eventually transmitted in a direction tending to counteract the upwardly directed load resisting forces induced in the lattice framework by tensioning the wire ropes 52, 53.

It should also be noted that it might be feasible in some instances to so design the supports 15 and 16 that they will fit snug against the vertical ends of the lattice framework when the framework is in its final stressed condition. This might, of course, require some adjustment of the supports.

One thing that should be kept in mind, however, is the fact that all of the various length and height adjustments induced in the system by varying the tension in the wire ropes are of an extremely minute magnitude and the drawings should be taken as illustrative only.

Other variations of the invention will at once be apparent to those skilled in the art upon reading the foregoing specification. Accordingly, the scope of the invention is intended to be limited only by the scope of the following appended claims.

I claim:

1. A flexible belt conveyor, said conveyor being characterized by its relatively lightweight in proportion to the loads it is capable of carrying, said conveyor including, in combination, a framework, said framework being composed of a material deformable into a substantially upwardly convex condition upon the appropriate application of externally applied forces, two pairs of downwardly extending anchor members, one pair at each end portion of the framework, two generally parallel elongated bodily flexible dual purpose tension members extending between the anchor members, each elongated bodily flexible dual purpose tension member extending between two anchor members, one anchor member at each end portion of the framework, a plurality of idler assemblies suspended from the pair of generally parallel elongated tension members in load transferring relationship thereto, a load carrying flexible belt supported by the idler assemblies, structure connecting the elongated tension members to the framework intermediate its end portions in load transferring relationship thereto whereby the weight of the load on the belt is applied, in a downward direction, to the framework, and means for applying tension to the elongated tension members of a magnitude capable of inducing upwardly directed load resisting forces in the framework sufficient to overbalance the downwardly directed dead weight forces and at least partially counterbalance live loads carried by the conveyor.

2. The flexible belt conveyor of claim 1 further including a pair of reinforcing braces at one end of the conveyor extending from a point on the anchor members below the point of connection of the tension members to the anchor members upwardly to the framework, one reinforcing brace for each anchor member, said reinforcing braces being so angled from the vertical as to exert a force having a component oriented in a direction opposite the direction of tension in the tension members.

3. The flexible belt conveyor of claim 1 further characterized in that at least one end of the framework is slidable with respect to its support point in a direction generally parallel to its length.

References Cited in the file of this patent

UNITED STATES PATENTS

| | | |
|---|---|---|
| 39,447 | Jones | Aug. 4, 1863 |
| 828,296 | Baldwin | Aug. 14, 1906 |
| 993,737 | Thurman | May 30, 1911 |
| 1,398,756 | Walker | Nov. 29, 1921 |
| 2,793,738 | Erickson | May 28, 1957 |
| 2,842,786 | Digby-Smith et al. | July 15, 1958 |
| 2,883,035 | Erisman | Apr. 21, 1959 |